US008879858B1

(12) United States Patent
Mobbs

(10) Patent No.: US 8,879,858 B1
(45) Date of Patent: Nov. 4, 2014

(54) MULTI-CHANNEL BIT PACKING ENGINE

(71) Applicant: GoPro, Inc., San Mateo, CA (US)

(72) Inventor: Paul Mobbs, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 14/189,973

(22) Filed: Feb. 25, 2014

Related U.S. Application Data

(60) Provisional application No. 61/885,412, filed on Oct. 1, 2013.

(51) Int. Cl.
*G06K 9/36* (2006.01)
*H04N 7/12* (2006.01)
*H04N 19/102* (2014.01)
*H04N 19/184* (2014.01)

(52) U.S. Cl.
CPC ....... *H04N 7/26287* (2013.01); *H04N 7/26106* (2013.01)
USPC ...................................... 382/232; 375/240.11

(58) Field of Classification Search
USPC ........ 382/232, 240, 247; 375/240.11, 240.19, 375/240.21
See application file for complete search history.

(56) References Cited

U.S. PATENT DOCUMENTS

| 5,933,137 | A  | * | 8/1999  | Anderson      | 715/720    |
|-----------|----|---|---------|---------------|------------|
| 7,382,926 | B2 | * | 6/2008  | Joshi et al.  | 382/240    |
| 7,418,142 | B2 | * | 8/2008  | Zandi et al.  | 382/232    |
| 7,457,473 | B2 | * | 11/2008 | Schwartz et al.| 382/240   |
| 7,536,054 | B2 | * | 5/2009  | Banno et al.  | 382/232    |
| 8,238,434 | B2 | * | 8/2012  | Fukuhara et al.| 375/240.19|
| 8,301,803 | B2 | * | 10/2012 | Wegener       | 709/247    |

* cited by examiner

*Primary Examiner* — Kanjibhai Patel
(74) *Attorney, Agent, or Firm* — Fenwick & West LLP

(57) ABSTRACT

A system and method are provided for packing compressed image data into a format suitable for encoding. The system includes a plurality of sub-band state registers, which store compressed image data from a corresponding sub-band. A bit packer receives a stream of bits of compressed image data, and concatenates the input bits with bits stored in one of the sub-band state registers. If a length of the concatenated bits is less than a width of an output data bus, the bit packer stores the concatenated bits in the sub-band state register. If the length of the concatenated bits is greater than or equal to the width of the output data bus, the bit packer outputs the concatenated bits via the output data bus.

20 Claims, 5 Drawing Sheets

MULTI-CHANNEL BIT PACKING ENGINE

CROSS REFERENCE TO RELATED APPLICATIONS

This application claims the benefit of U.S. Provisional Application No. 61/885,412, filed Oct. 1, 2013, which is incorporated by reference in its entirety.

BACKGROUND

1. Field of Art

The disclosure generally relates to the field of image capture systems, and in particular to accelerating image capture.

2. Description of the Related Art

As image sensor technology improves, image sensors are becoming able to capture images and videos at increasingly higher resolutions and frame rates. Video compression and encoding are often used to transform raw high resolution and high frame rate video data into a more compact data type suitable for storage, transmission, playback, and so forth. Before the encoding process can be performed, video encoding algorithms often require raw video data to be in a particular format, such as contiguous blocks each having a specified number of bits. However, many video data compression methods use variable-length encoding, and thus do not generate the contiguous fixed-size blocks needed for encoding.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
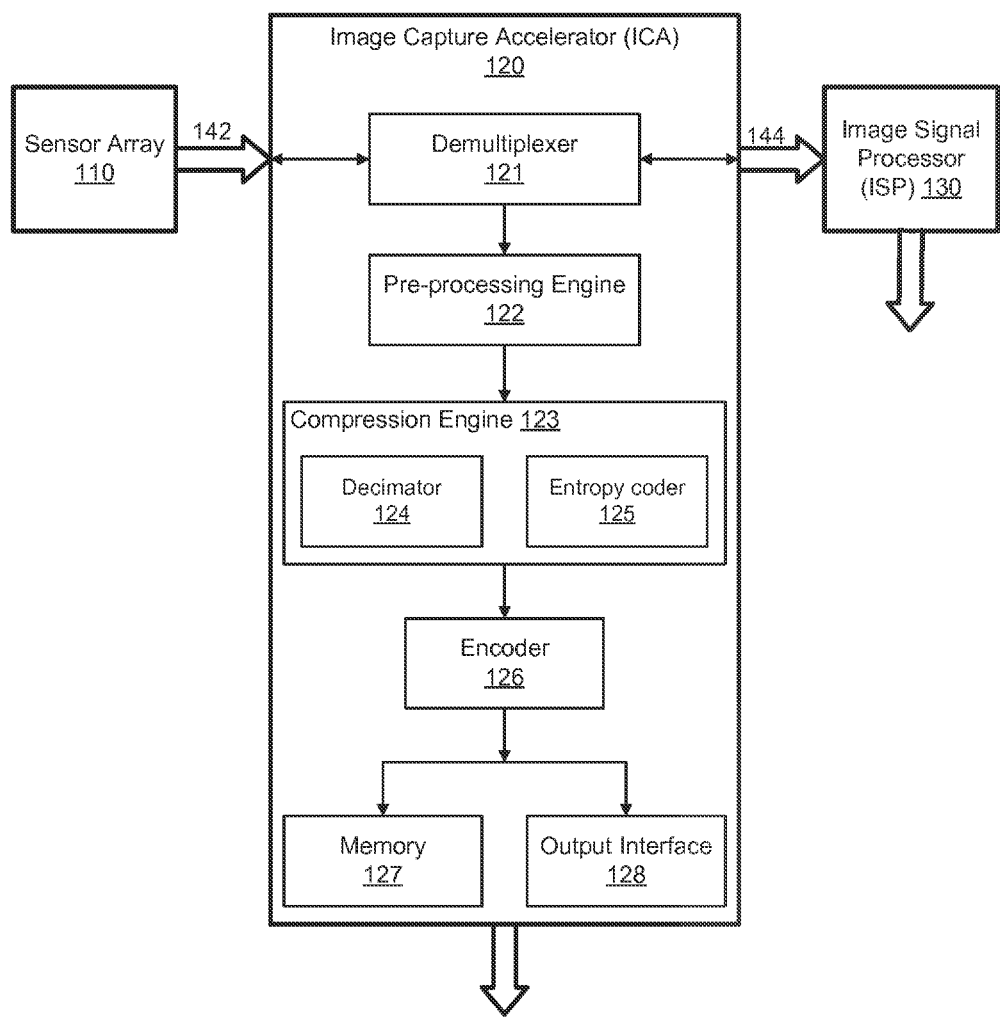
FIG. 1 illustrates one embodiment of a system for image capture acceleration.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

An image capture accelerator provides for the accelerated processing of image data. In one example embodiment, an image capture system architecture is configured to incorporate an image capture accelerator (ICA). The ICA is configured to address limited ISP bandwidths and/or excessive system power usage while enabling the capture of images at high frame rates. In one example embodiment, the ICA is a device that sidesteps traditional ISP image processing in an image capture system (such as a digital camera) in order to increase the bandwidth and/or decrease the power use of the image capture system. The ICA can be a dedicated ASIC, can be implemented within an image sensor or ISP chip architecture, or can be implemented using existing hardware, firmware, and/or software.

In one embodiment, an image capture accelerator includes accelerator circuitry including a pre-processing engine and a compression engine. The pre-processing engine is configured to perform accelerated processing on received image data, and the compression engine is configured to compress processed image data received from the pre-processing engine. In one embodiment, the image capture accelerator further includes a demultiplexer configured to receive image data captured by an image sensor array, for example on an image sensor chip. The demultiplexer outputs the received image data to an image signal processor (ISP) when the image data is captured by the image sensor array in a first capture mode ("standard mode"), and outputs the received image data to the accelerator circuitry when the image data is captured by the image sensor array in a second capture mode ("accelerated mode"). It should be noted that the ICA may process captured image data in additional modes as understood to those of skill in the art, such as a time lapse mode.

In one embodiment, the standard capture mode is associated with the capture of images at a first frame rate and first resolution, and the accelerated capture mode is associated with the capture of images at a second frame rate and second resolution. In some embodiments, the first frame rate is lower than the second frame rate, and/or the first resolution is lower than the second resolution. Accordingly, when the capture of frames is desired at a higher resolution and/or frame rate than the ISP can accommodate, the ICA can operate in the accelerated mode, and the demultiplexer can output captured image data to the accelerator circuitry.

Image data processed by and output from an ICA may not be in a standard image format, but rather may be in a format requiring further decoding (for instance, to decode coding performed by the ICA) and/or processing (for instance, to format the image data into a standard image format, such as JPEG or PNG). This post-processing can occur within the camera (for instance, subsequent to the capture of the image data) or outside of the digital camera system (for instance, offline in a computer or a mobile device). Further, the image capture system architecture described herein can include additional components configured to receive and process the image data output from the ICA. In one example embodiment, the ICA can capture and process image data in an accelerated mode, can store the processed image data, and can post-process the stored image data into a viewable image format at a later time.

In one embodiment, when capturing high-resolution and/or high frame rate image data, the ICA compresses and encodes image data for efficient storage and transmission. The ICA can include an entropy coder configured to compress image data, for example by wavelet compression. Wavelet compression generates a plurality of sub-band components, which may be of variable length. To format the compressed image data for encoding, the ICA includes a bit packing engine configured to pack the compressed image data according to sub-band components. The bit packing engine includes a plurality of sub-band state registers, each of which store compressed image data from a corresponding sub-band. A bit packer receives a stream of bits of compressed image data, and concatenates the input bits with bits stored in one of the sub-band state registers. If a length of the concatenated bits is less than a width of an output data bus, the bit packer stores the concatenated bits in the sub-band state register. If the length of the concatenated bits is greater than or equal to the width of the output data bus, the bit packer outputs the concatenated bits by the output data bus to a non-transitory computer-readable storage medium. Because the bit packing engine buffers input data in sub-band state registers, the bit packing engine has a higher throughput than would be achieved by storing the data in an external memory before performing bit packing. Furthermore, the bit packing engine can use a single bit packer to pack bits from a plurality of sub-bands, occupying less chip space than a bit packing engine using a separate bit packer for each sub-band.

Example Image Capture Acceleration System

Turning now to FIG. 1, it illustrates a system 100 for image capture acceleration including a sensor array 110, an ICA 120, and an ISP 130. As illustrated in FIG. 1, the ICA 120 is coupled to the sensor array 110 and the ISP 130. A communication bus 142 couples the sensor array 110 to the ICA 120, and a second communication bus 144 couples the ICA 120 to the ISP 130. In this embodiment and others, the communication buses 142, 144 are selected based on the bandwidth requirements of the image capture system 100. For example, the bus 142 may be implemented such that the bus 142 does not inhibit image data transfer or otherwise act as a bottleneck for the image capture system 100.

The sensor array 110 is configured to capture image data and output the image data to a processor, such as the ICA 120 or the ISP 130. In one embodiment, the sensor array 110 is a Bayer color filter array, and the sensor array 110 outputs raw Bayer pattern data. Other types of image sensors may also be used in the accelerated image capture system 100. The sensor array 110 may be configured to capture image data at one or more frame rates and one or more resolutions, for example as specified by a user, under the control of a camera processor (not shown) or the ISP 130. Although not shown in FIG. 1, the sensor array 110 can be implemented within an image sensor chip, for instance a charge-coupled device ("CCD") or complementary metal-oxide semiconductor ("CMOS"), configured to convert captured light incident upon the image sensor chip into electrical signals representing the captured light ("image data" herein).

The ISP 130 processes raw image data received from the sensor array 110 and generates processed image data for output to a display screen, memory, or external computing device. In one embodiment, the ISP 130 performs processing steps including clean Bayer processing, demosaicing, etc., as well as compression to format the raw image data for output. In various embodiments, the ISP 130 may be configured to process the image data to generate image or video files in standard formats, such as JPEG, PNG, TIFF, AVI, or MPEG.

The ICA 120 intercepts image data captured by the sensor array 110 before it is output to the ISP 130. In one embodiment, the ICA 120 is configured to process the image data in response to a user request to accelerate image processing. In another embodiment, the ICA 120 is configured to automatically provide the image data to the ISP 130 when the image sensor captures images in a standard capture mode (for instance, at a low frame rate and/or resolution) and to process the received image data when the image sensor captures images in an accelerated capture mode (for instance, at a higher frame rate and/or resolution). For example, the ICA 120 may send image data to the ISP 130 when the image data is captured at 120 frames per second (fps) and 1080p resolution, while the ICA 120 may process image data (by accelerated processing) when the image data is captured at 240 fps and 4K resolution.

The standard and accelerated capture modes may be defined relative to thresholds. Specifically, the accelerated capture mode can be implemented when capturing image data at an above-threshold frame rate or an above-threshold resolution. In such instances, the thresholds can be low enough to guarantee that image data captured below the threshold frame rate and/or resolution can be processed by the ISP 130. For example, the thresholds may be selected such that a low-end ISP can process the image data captured in the standard capture mode. This allows potential cost savings to be realized by allowing a less expensive ISP to be implemented in the image capture system. Moreover, potential power savings may be realized by using the ICA 120, rather than the ISP 130, for higher-power image processing circumstances.

It should be noted that in one embodiment, when the image sensor captures images in the first mode, the ICA 120 can process the received image data (instead of the ISP 130). For example, in addition to processing image data captured at above-threshold frame rates and resolutions, the ICA 120 may process image data captured at low frame rates and low resolutions (e.g., for previewing images), low frame rates and high resolutions (e.g., for time lapse photography), and high frame rate and low resolution (e.g., for low-bandwidth streaming). Image data may alternatively be processed in parallel by the ICA 120 and ISP 130. Furthermore, when the ICA 120 processes image data, the ISP 130 can remain idle, or can simultaneously process downscaled and/or frame rate-lowered image data (for instance, image data received from the ICA 120), allowing the ISP 130 to keep up with the pace of captured image data while minimizing power consumption. For example, images at 4K resolution captured at 60 fps by the image sensor may be processed by the ICA 120. At the same time, these images can be downscaled (e.g., to a WVGA resolution) at 30 fps (either by the ICA 120 or the ISP 130) and processed by the ISP 130. Such an embodiment allows the image data processed by the ISP 130 to be used for previewing images processed at full resolution and frame rate by the ICA 120, to be stored at the downscaled resolutions and frame rates, to be streamed via WiFi or other low-bandwidth streaming, and the like.

The sensor array 110 may communicate a preferred processing mode (for instance, processing with either the ICA 120 in accelerated capture mode or the ISP 130 in standard capture mode) via the communication bus 142. Alternatively, the ICA 120 may receive information from the camera controller requesting a capture mode, and can determine whether to send the image data to the ISP 130 for processing or to process the image data with the accelerator circuitry of the ICA 120 in response. In one embodiment, a camera controller provides an instruction to operate in standard mode or accelerated mode, and the ICA 120 configures the demultiplexer 121 in response.

In the embodiment illustrated in FIG. 1, the ICA 120 includes a demultiplexer ("demux") 121, a pre-processing engine 122, a compression engine 123, an encoder 126, a memory 127, and one or more output interfaces 128. In other embodiments, the ICA 120 may include fewer, additional, or different components than those described herein, such as one or more CPU cores and memories (which may be configured to function as an ISP in all or certain circumstances), one or more high dynamic range pre-processors, encryption engines, metadata embedding modules, linearization lookup tables, and the like.

The demux 121 is configured to receive image data captured by the sensor array 110 and output the image data to the ISP 130 for processing or output the image data to accelerator circuitry within the ICA 120 for processing. In one embodiment, the demux 121 is an analog demux to reduce power consumption of the ICA 120. In one embodiment the demux 121 outputs the image data to the ISP 130 for processing during image capture at frame rates and/or resolutions that do not require accelerated image processing or large amounts of processing power. The demux 121 can output image data to the accelerator circuitry of the ICA 120 during high frame rate or high resolution image capture modes, or during any other time (for example, during other processing-intensive capture modes, when selected by the user, and the like). In one embodiment, the sensor array 110 controls the control lines of the demux 121, for instance by communicating a control signal based on a desired capture mode. Alternatively, the sensor array 110 can communicate various information useful in making image data processing decisions to the demux 121, such as the frame rate and resolution of image capture, and the demux 121 or ICA 120 can output image data to the ISP 130 or process it at the ICA 120 based on the received information. It should be noted that in some embodiments, the demux 121 may be external to the ICA 120.

The accelerator circuitry of the embodiment of the ICA 120 illustrated in FIG. 1 includes the pre-processing engine 122, the compression engine 123, the memory 127, and the output interface 128. In one embodiment, the pre-processing engine 122 is configured to perform Bayer processing on image data, such as repairing defective pixels, correcting color and luminance, and repairing other capture errors. The pre-processing engine 122 may also perform one or more image processing operations on the image data including demosaicing operations, noise reduction operations, image sharpening operations, resolution adjustment, color correction and/or color space conversion, brightness adjustment, pixel formatting operations, quantization, iHDR parsing or other forms of parsing, and the like. In some embodiments, the pre-processing engine 122 performs only minimal processing operations, and does not perform processing operations that require over a threshold amount of time and/or consume over a threshold amount of power.

The compression engine 123 is configured to compress the image data by lossy or lossless compression into a compressed data format of equal or smaller size than the original image data. For example, the compression engine 123 may compresses the processed image data using a wavelet compression algorithm, such as VC-5 or CINEFORM™. An advantage of using a wavelet compression algorithm is the generation of downscaled images, which in one embodiment may be output by the compression engine 123 to the ISP 130 or to a display screen of a camera (e.g., for a user to preview the images).

In one embodiment, as shown in FIG. 1, the compression engine 123 includes a decimator 124 and an entropy coder 125. The decimator 124 and the entropy coder 125 collectively perform one or more implementations of wavelet compression, for instance VC-5. The decimator 124 receives image data from the sensor array 110 via the demultiplexer 121 and decimates the image data to form image sub-band components. In some embodiments, the decimator 124 includes a horizontal high-pass filter, a horizontal low-pass filter, a vertical high-pass filter, and a vertical low-pass filter. The image data can first be processed using the horizontal high-pass and low-pass filters, producing horizontally-filtered sub-band image data components. The horizontally-filtered sub-band components can subsequently be processed using the vertical high-pass and low-pass filters, producing sub-band decimated image data components. In other embodiments, the decimator produces sub-band decimated image data components by filtering the image data in a different order, or by using different filters than those described herein.

The decimator 124 can iteratively decimate image data, producing sub-band decimated image components of increasing granularity. In some embodiments, only certain sub-band decimated image components are iteratively decimated, for instance a sub-band decimated image component that has been processed with both a horizontal low-pass filter and a vertical low-pass filter (a "low/low sub-band component" hereinafter). In such embodiments, the sub-band decimated image data components produced by the decimator 124 are of varying granularity.

Figure 4:
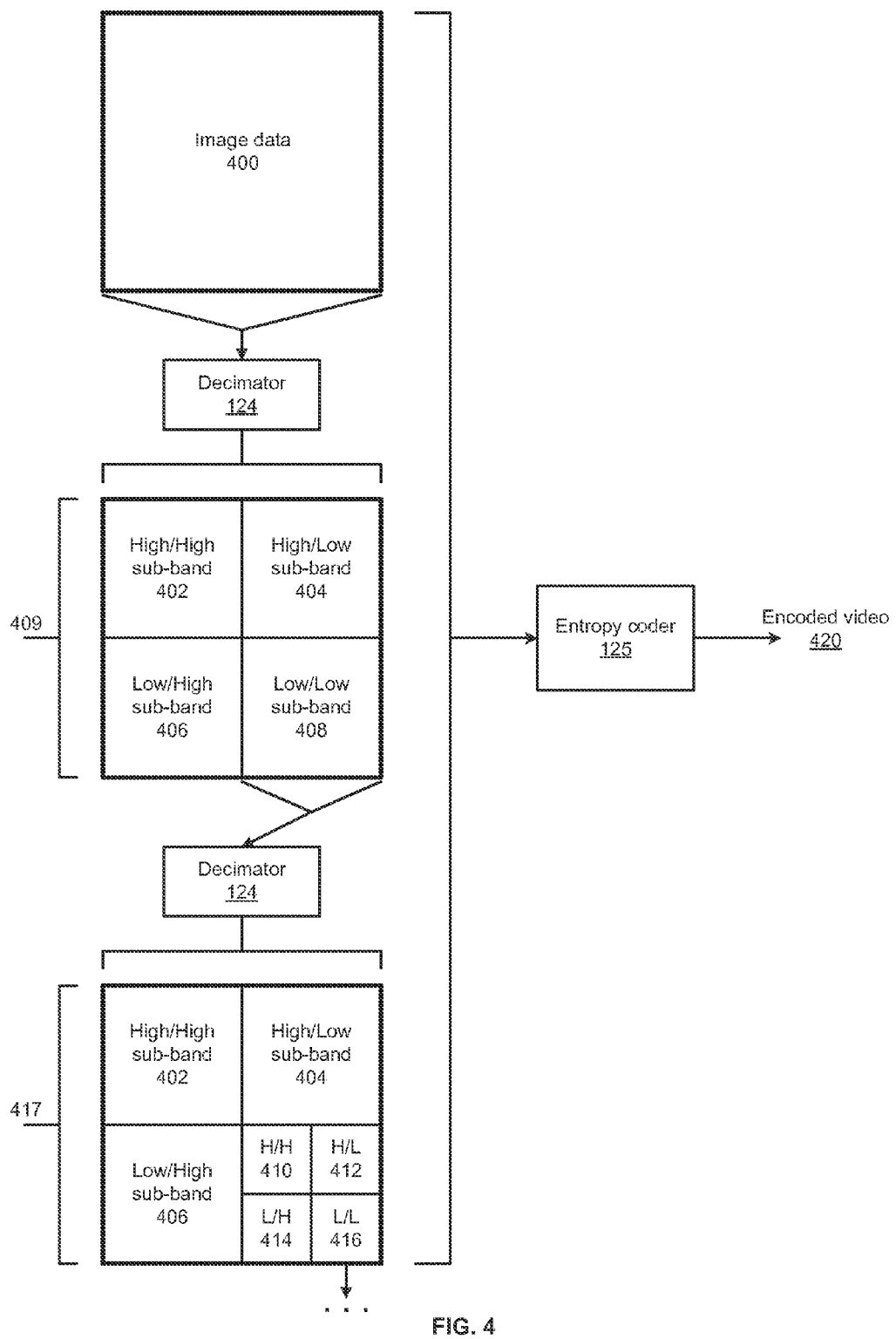
FIG. 4 illustrates an embodiment of image compression via wavelet compression.

FIG. 4 illustrates an embodiment of image compression via wavelet compression. In the embodiment of FIG. 4, image data 400 is accessed by the decimator 124. The decimator 124 decimates the image data 400 to produced decimated image data 409 using a horizontal high-pass filter, a horizontal low-pass filter, a vertical high-pass filter, and a vertical low-pass filter to create sub-band components. In one embodiment, the decimator 124 first processes the image data 400 using the horizontal filters, producing a horizontal high-pass sub-band component and a horizontal low-pass sub-band component. Continuing with this embodiment, the decimator 124 then processes the horizontal high-pass sub-band component using a vertical high-pass filter, producing a high/high sub-band component 402. The decimator 124 also processes the horizontal high-pass sub-band component with a vertical low-pass filter, producing a high/low sub-band component 404. The decimator 124 next processes the horizontal low-pass sub-band component using a vertical high-pass filter, producing a low/high sub-band component 406. Finally, the decimator 124 processes the horizontal low-pass sub-band component using a vertical low-pass filter, producing a low/low sub-band component 408.

It should be noted that in the embodiment of FIG. 4, the heights of the horizontal sub-band components output by the horizontal high-pass filter and the horizontal low-pass filter are equal to the heights of the image data 400, and the widths of the horizontal sub-band components are equal to one-half of the width of the image data 400. In addition, in the embodiment of FIG. 4, the widths and heights of the sub-band components 402, 404, 406, and 408 are equal to one-half the width and height, respectively, of the image data 400. In various embodiments, the low/low sub-band component 408 includes the image represented by the image data 400 at one-quarter the resolution of the image data 400. For instance, if the image data 400 is a 4k image (3840 pixels by 2160 pixels), the low/low sub-band component 408 can be a 1080p image (1920 pixels by 1080 pixels).

In the embodiment of FIG. 4, the decimator 124 can further decimate the image data in a second decimation iteration to create decimated image data 417 by decimating the low/low sub-band component 408. In such an embodiment, the decimator 124 processes the low/low sub-band component 408 using the horizontal high-pass filter, the horizontal low-pass filter, the vertical high-pass filter, and the vertical low-pass filter described as described above. Decimating the low/low sub-band decimated image data component 408 produces a second high/high sub-band component (H/H 410), a second high-low sub-band component (H/L 412), a second low-high sub-band component (L/H 414), and a second low-low sub-band component (L/L 416). Upon the second decimation iteration, the low/low sub-band component 408 is replaced within the decimated image data 409 with H/H 410, H/L 412, UH 414, and UL 416 to form the decimated image data 417. Both the decimated image data 409 and the decimated image data 417 include the high/high sub-band component 402, the high/low sub-band component 404, and the low/high sub-band component 406.

A third decimation iteration can be performed on the L/L sub-band component 416. Additional decimation iterations can also be performed on subsequent L/L sub-band components. The UL sub-band component 416 includes the image represented by the image data 400 at one-sixteenth the resolution of the image data 400. For instance, if the image data 400 is a 4k image, the UL sub-band component 416 can be an image of 960 pixels by 540 pixels.

A set of decimated image data is accessed by the entropy coder 125, and is encoded to form the encoded video 420. In one embodiment, the decimated image data 409 is encoded by the entropy coder 125. Alternatively, the decimated image data 417 can be encoded by the entropy coder 125. In some embodiments, the set of decimated image data encoded by the entropy coder 125 is dependent on the performance or memory requirements of the image capture system, a user-selected or default image capture mode, or based on any other suitable criteria. It should be noted that in some embodiments, upon encoding a set of decimated image data with the entropy coder 125, the decimator 124 does not perform further decimation iterations.

In one embodiment, the compression engine 123 is configured to output a decimated image data component to the ISP 130 over the communication bus 144 or another data path. For instance, the compression engine 123 can output a low/low sub-band decimated image data component, such as component 408 or component 416. As noted above, the low/low sub-band decimated image data components are lower-resolution versions of images represented by image data received from the sensor array 110. Accordingly, by outputting lower resolution image by-products of the wavelet compression performed by the compression engine 123, the ISP 130 has access to lower-resolution image data without requiring additional processing to be performed by the compression engine 123. It should be noted that the compression 123 can output sub-band components to the ISP 130 either before or after performing entropy encoding on the sub-band components.

Returning to FIG. 1, the entropy coder 125 performs entropy encoding on the decimated image data produced by the decimator 124 to create encoded image data. In some embodiments, the decimated image data includes wavelet coefficients, coefficients representative of image pixels or of other image properties, or the like. The entropy encoder 125 can quantize these coefficients, can query one or more tone map look-up tables using the coefficients, and can perform entropy encoding on the quantized coefficients to create entropy encoded image data.

One embodiment and implementation of wavelet compression is described in greater detail in U.S. patent application Ser. No. 13/113,950, entitled "Encoding and Decoding Selectively Retrievable Representations of Video Content", filed May 23, 2011, the contents of which are hereby incorporated in their entirety.

Figure 5:
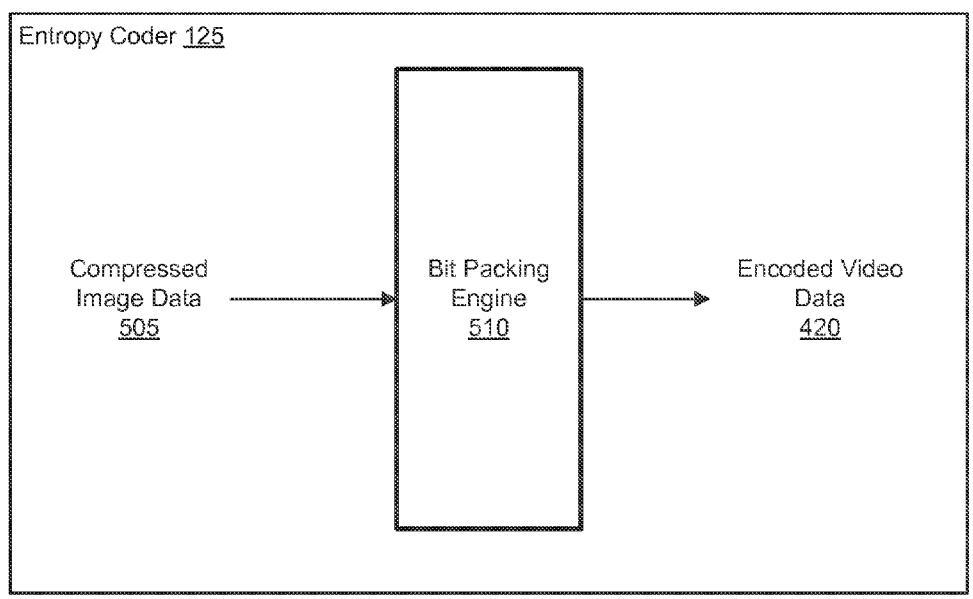
FIG. 5 is a high level block diagram illustrating an embodiment of a bit packing engine for packing compressed image data.

The entropy coder 125 is further configured to pack compressed image data into a compliant bitstream for encoding. As some encoding techniques require image data to be organized into contiguous, fixed-size blocks prior to encoding, the entropy coder 125 packs the image data without gaps before sending the image data to an encoder, such as the encoder 126. An embodiment of the entropy coder 125 for packing the image data into a compliant bitstream is illustrated in FIG. 5.

The encoder 126 is configured to encode image data, such as image data received from the sensor array 110 or decimated image data received from the compression engine 123. The encoder 126 is an encoder configured to encode image data using one or more encoding algorithms or methods. In one embodiment, the encoder 126 encodes image data using the H.264 encoding algorithm, though it should be known that in other embodiments, the encoder 126 can implement any other suitable image or video encoding algorithms. Furthermore, in other embodiments, the encoder 126 is external to the ICA 120. For example, the encoder 126 may be a component of the ISP 130 or an external computer (not shown).

The memory 127 is configured to store image data, either on a permanent or temporary basis. For instance, the compression engine 123 can store image data in the memory 127 between decimation iterations, or after decimation and/or encoding by the entropy coder 125. In some embodiments, encoded image data is stored at the memory 127 prior to being outputted to an external storage module via the output interface 128. In some embodiments, image data stored external to the ICA 120 is retrieved via the output interface 128 and stored in the memory 127 for subsequent encoding and/or decoding by the ICA 120.

The one or more output interfaces 128 may output the processed image data to a non-transitory computer-readable storage medium (e.g., flash memory or disk), or can output the processed image data to another component (such as a processor) for storage, subsequent processing or access, and/or formatting. In one embodiment, the output interface(s) 128 include a physical layer interface coupled to a storage medium, processor, or other component.

In one embodiment, the output image data can be processed via a standard image processing pipeline to format the image data into a standard image or video format (such as the JPEG format, the PNG format, or the MPEG format). This image processing pipeline can be located external to the camera, such as in a computer or other mobile device. By locating the standard image processing pipeline on a device external to the camera, a higher level of image processing quality can be achieved by the external device, provided the external device has access to the requisite processing and power resources and requisite time. Further, by having an external device perform such standard image processing, processing and power load savings can be realized by the camera.

Figure 2:
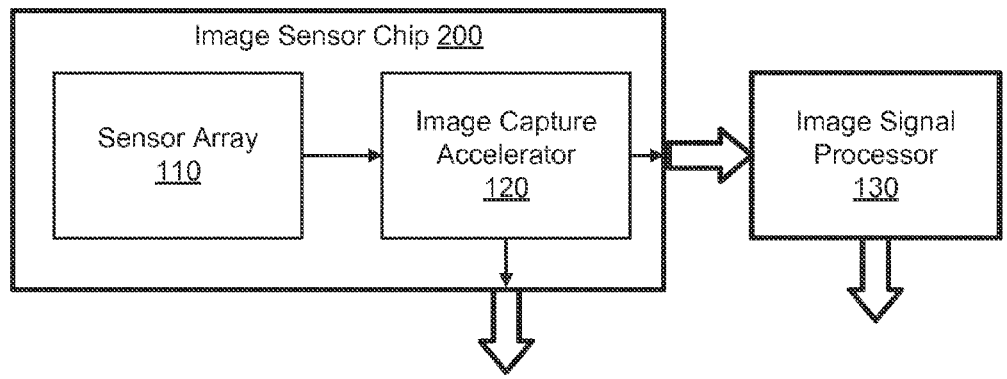
FIG. 2 illustrates an alternative embodiment of the system for image capture acceleration.
Figure 3:
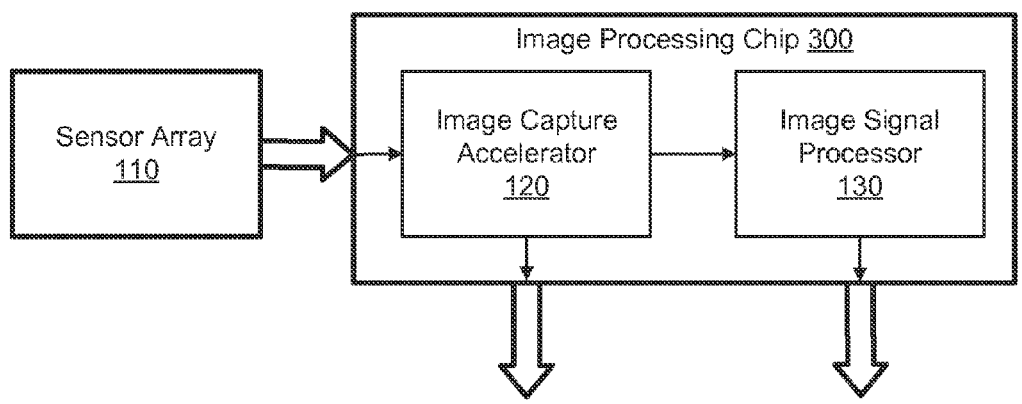
FIG. 3 illustrates an alternative embodiment of the system for image capture acceleration.

As shown in FIG. 1, the ICA 120 is a dedicated IC external to the sensor array 110 and the ISP 130. However, in other embodiments, the ICA 120 and one or more of the sensor array 110 and the ISP 130 can be implemented as a single component. For example, FIG. 2 illustrates an image sensor chip 200 including the sensor array 110 and the ICA 120, which outputs image data to the ISP 130 or another external device, such as a memory internal or external to the camera, or an external processor. Similarly, the ISP 130 may output processed image data to an internal or external memory, another processor, or the like. FIG. 3 illustrates an image processing chip 300 including the ICA 120 and ISP 130. The image processing chip 300 receives raw image data from the sensor array 110 and outputs processed image data to, for example, a memory internal or external to the camera. It should be noted that the components of the ICA 120 described with respect to FIG. 1 can be implemented within the other embodiments described herein; for example, the embodiments of FIGS. 2 and 3 may include one or more of the demux 121, pre-processing engine 122, compression engine 123, encoder 126, memory 127, and output interface 128 in the processing path.

Bit-Packing Engine

FIG. 5 illustrates an embodiment of the entropy coder 125 configured to output compressed, packed image data. In the embodiment illustrated in FIG. 5, the entropy coder 125 includes a bit packing engine 510 for receiving compressed image data 505 and generating encoded video data 420 for storage by the memory 127 or an external memory. Other embodiments of the entropy coder 125 include additional components. In various embodiments of the image capture accelerator 120, the encoded image data 505 received by the bit packing engine 510 can include data encoded by wavelet compression, H.264, or various other compression techniques.

Figure 6:
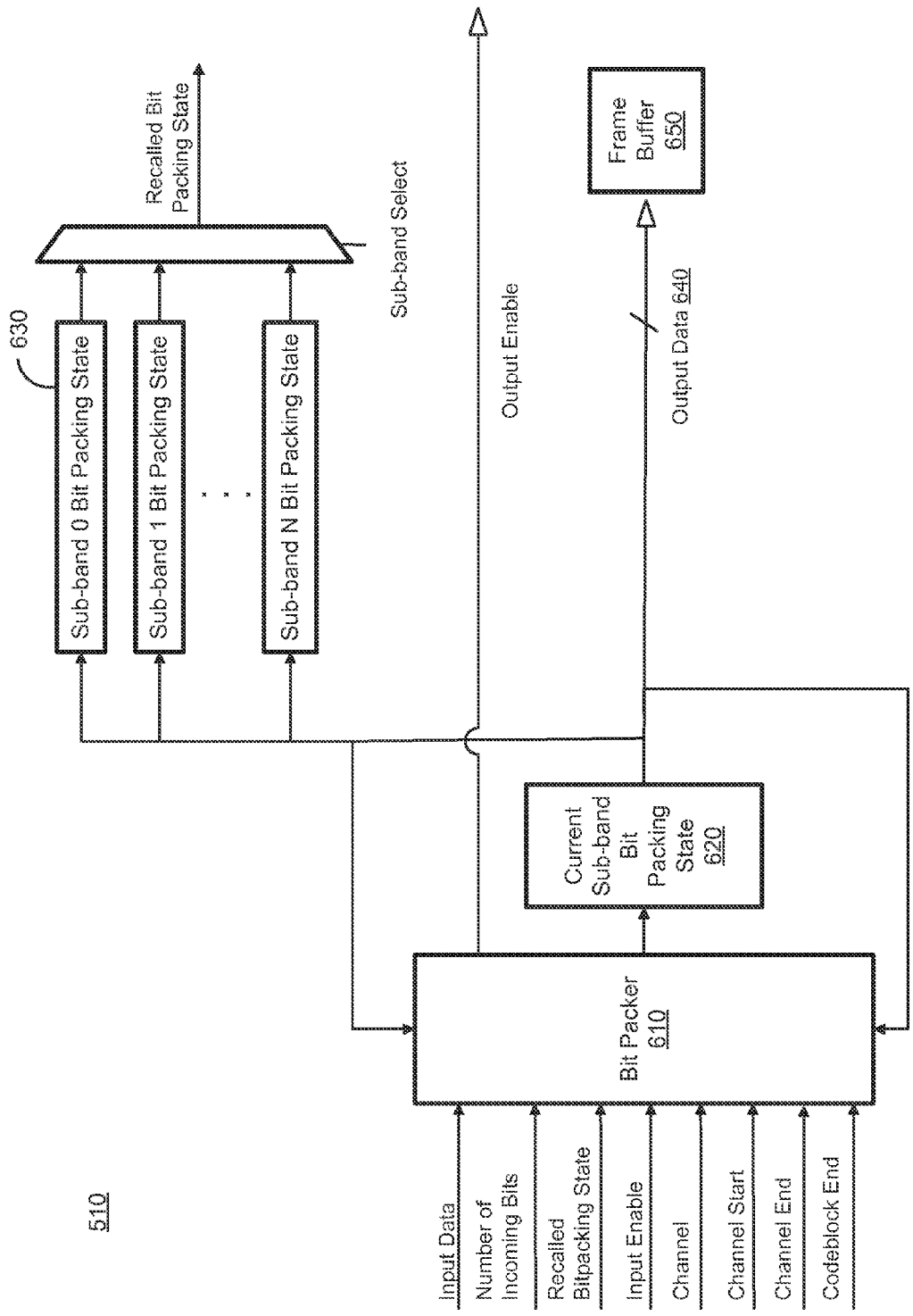
FIG. 6 illustrates a block diagram of the bit packing engine for packing compressed image data.

A block diagram illustrating an embodiment of the bit packing engine 510 is shown in FIG. 6. In one embodiment, the bit packing engine 510 is configured to process sub-bands of encoded image data in parallel. The bit packing engine 510 includes bit packer 610, a current sub-band bit packing state register 620, and a plurality of bit packing state registers 630. In one embodiment, the bit packing engine 510 includes one bit packing state register 630 for each sub-band input to the bit packing engine 510. A count indicating a number of bits currently being stored by each state register is stored, for instance within each state register or within the bit packer 610. Other embodiments of the bit packing engine 510 include fewer, additional, or different components. For example, in some cases, the current sub-band bit packing state register is a component of the bit packer 610.

In general, the bit packing engine 510 is configured to generate packed data suitable for encoding by any of a plurality of video encoding algorithms. The bit packing engine 510 uses the bit packing state registers 630 to buffer sub-bands of input data until a complete block of data is ready for output. Thus, the bit packing engine 510 packs incoming video data into contiguous fixed-size blocks according to sub-band, without sending the data to an external memory before packing.

Referring to FIG. 6, the bit packer 610 receives the input data, a "number of incoming bits" signal representative of the number of bits of received input data, a "recalled bit packing state" signal representative of the number of bits of input data currently associated with a particular sub-band currently being stored within the state registers 620 and 630, an "input enable" flag, a sub-band identifier (the "channel" signal), a sub-band start flag (the "channel start" signal) indicating received input data representative of the beginning of an image sub-band, a sub-band end flag (the "channel end" signal) indicating received input data representative of the end of an image sub-band, and a codeblock end flag (the "codeblock end" signal) indicating received input data representative of the end of an image. The bit packer 610 receives input data, and receives signals corresponding to the input data, for instance an input enable flag indicating that input data is ready to be received, a number of incoming bits signal identifying a number of bits of the input data, and a channel signal identifying the sub-band associated with the input data.

When the input enable flag is asserted, the bit packer 610 identifies a sub-band associated with input data, and accesses bits associated with the identified sub-band stored within the registers 620 and 630. For instance, if bits associated with the identified sub-band are currently stored in the current channel bit packing state register 620, the bit packer 610 determines the number of bits associated with the identified sub-band that are stored within the register 620. Alternatively, if the register 620 is not currently storing bits associated with the identified sub-band, the bit packer 610 accesses the bits associated with the identified sub-band stored in a register 630 corresponding to the identified sub-band. In some embodiments, if the register 620 stores bits associated with a different sub-band than the identified sub-band, the register 620 writes the bits associated with the different sub-band to the register 630 corresponding to the different sub-band, and register 630 corresponding to the identified sub-band writes bits associated with the identified sub-band to the register 620.

After any stored bits corresponding to an identified sub-band are copied from a corresponding register 630 to the register 620 or the bit packer 610, the bit packer determines a number of bits of input data to be received based on the number of incoming bits signal, and determines the number of bits of data corresponding to the identified sub-band being stored within the register 620. If the sum of the number of incoming bits signal and the recalled bit packing state signal is less than the width of the output data bus 640, the bit packer 610 concatenates the input data to the data stored in the register 620. The bit packer 610 then increases the count of stored bits corresponding to the identified sub-band by a number equal to the number of incoming bits signal.

If the sum of the number of incoming bits signal and the recalled bit packing state signal is greater than the width of the output data bus 640, the bit packer 610 concatenates a number of bits of input data equal to the difference between the recalled bit packing state signal and the width of the output data bus 640 to the data stored in the register 620 and asserts an output enable signal. The output enable signal indicates that a newly-packed data word is available for output via the output data bus 640 (e.g., to the memory 127 or a frame buffer 650). After outputting the newly-packed word via the output data bus 640, the bit packer 610 sets the count of stored bits corresponding to the identified sub-band to the difference between the previous count and the width of the output data bus 640. The bit packer 610 then shifts the bits stored by the register 620 to store the bits not output via the data bus 640, stores any remaining bits from the received input data that were not included in the outputted packed data word in the newly reset register 620, and updates the count of stored bits to reflect the number of bits stored in the register 620. The bit packer 610 may also output one or more signals to identify the packed data being output, such as the channel signal, the channel start signal, the channel end signal, or the codeblock end signal.

The sub-band start flag (the "channel start" signal) indicates that received input data corresponds to a new sub-band. For instance, received input data can span multiple sub-bands. In such instances, the channel start signal can indicate the transition of input data to a new sub-band by indicating the beginning of the sub-band. When the channel start signal is asserted, the bit packer 610 identifies the new sub-band by sampling the channel signal. In some cases, the bit packer 610 additionally or alternatively samples the channel signal when the input enable flag is asserted, allowing non-contiguous channels to be packed. Similarly, the sub-band end flag (the "channel end" signal) indicates that received input data no longer corresponds to a current sub-band. When the channel end signal is received, if the number of bits stored in the register 620 is equal to the width of the output data bus 640, the bits stored in the register 620 are output as a packed data word on the output data bus 640. If the number of bits is less than the width of the output data bus 640, when the channel end signal is received, the number of bits stored in the register 620 are written to a register 630 corresponding to the current sub-band. When a subsequent channel start signal is received, the bits stored in a register 630 corresponding to the sub-band identified by the channel signal are written to the register 620.

Accordingly, each bit packing state register 630 stores bits of received input data corresponding to various sub-bands until they are concatenated with incoming bits associated with each corresponding sub-band and outputted via the output data bus 640. The bit packer 610 can receive and pack bits associated with individual image frames, or with multiple sequential image frames representative of video. When input data associated with the end of a set of image data or video data is provided, the codeblock end signal is asserted. When the bit packer 610 receives the codeblock end signal, the bit packer can sequentially access bits stored in each register 630 and output the accessed bits via the output data bus 640, despite the accessed bits representing a data word less than the width of the output data bus 640. In one embodiment, the bit packing engine 510 writes each compressed, packed or partially-packed wavelet sub-band to a frame buffer 650 for subsequent storage, processing, or transmission.

In one embodiment, rather than receiving both a channel start signal and a channel end signal, the bit packer 610 receives a single "sub-band active" signal. At the rising edge of the sub-band active signal, the bit packer 610 identifies a sub-band based on the channel signal, accesses bits corresponding to the identified sub-band from a corresponding register 630, and concatenates the accessed bits with received input data bits within the register 620. At the falling edge of the sub-band active signal, the bit packer 610 copies the contents of the register 620 to the register 630 corresponding to the identified sub-band.

Additional Configuration Considerations

The embodiments described herein provide systems and methods for accelerating image capture and storage in an image capture system. By accelerating image capture and storage, the image capture systems can capture images or videos at high frame rates and resolutions because the image capture systems are not limited by the capabilities of image signal processors. Moreover, accelerated capturing and storing may reduce power consumption of image capture systems, improving battery life of cameras including the accelerated image capture systems.

Furthermore, although the bit packing engine has been described herein with respect to an image capture acceleration system, the bit packing engine may be used in other contexts. For example, the bit packing engine may be implemented in a camera's image signal processor or a storage system internal or external to a camera. The bit packer may alternatively be used to pack other types of data besides image or video data and thus may be used in contexts other than image capture systems, such as networking.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "including," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a camera expansion module as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A system for bit-packing compressed image data, the compressed image data comprising bits in each of a plurality of sub-bands, the system comprising:
    a plurality of sub-band state registers, each sub-band state register corresponding to one of the plurality of sub-bands and configured to store bits of the compressed image data from the corresponding sub-band;
    an output data bus configured to output image data and comprising a data bus width; and
    a bit packer configured to:
        receive a stream of bits of the compressed image data;
        concatenate the bits of the received stream of bits with bits stored in a sub-band state register, the bits of the received stream of bits and the bits stored in the sub-band state register corresponding to a same sub-band;
        store the concatenated bits in the sub-band state register responsive to a length of the concatenated bits being less than the data bus width; and
        output a number of concatenated bits equal to the data bus width via the output data bus responsive to the length of the concatenated bits being greater than or equal to the data bus width.

2. The system of claim 1, wherein each of the plurality of sub-band state registers is configured to store a count of a number of bits stored by the respective sub-band state register, and wherein the bit packer is configured to concatenate the bits of the received stream of bits with the stored bits by:
    determining a number of bits of the received stream of bits to concatenate with the bits stored in the sub-band state register; and
    increasing the stored count of the number of bits stored by the sub-band state register by the determined number of bits.

3. The system of claim 1, wherein the bit packer is configured to concatenate the bits of the received stream of bits with the stored bits by:

receiving a sub-band identifier identifying the sub-band of the bits of the received stream of bits; and accessing the bits stored in the sub-band state register corresponding to the identified sub-band.

4. The system of claim 1, further comprising:

a decimator configured to convert raw image data to a plurality of sub-band components; and an entropy coder configured to compress the plurality of sub-band components to generate the compressed image data.

5. The system of claim 4, wherein the entropy coder is configured to compress the plurality of sub-band components by variable-length encoding.

6. The system of claim 4, wherein the entropy coder is configured to compress the plurality of sub-band components by wavelet compression.

7. The system of claim 4, wherein the raw image data comprises at least one of high resolution image data and high frame rate image data.

8. A system for processing image data, the system comprising:

a decimator configured to receive raw image data and convert the raw image data to decimated image data components in each of a plurality of sub-bands;

an entropy coder configured to compress the decimated image data to generate compressed image data;

a plurality of sub-band state registers, each sub-band state register corresponding to one of the plurality of sub-bands and configured to store bits of the compressed image data from the corresponding sub-band;

an output data bus configured to output image data and comprising a data bus width; and a bit packer configured to:

receive a stream of bits of the compressed image data;

concatenate the bits of the received stream of bits with bits stored in a sub-band state register, the bits of the received stream of bits and the bits stored in the sub-band state register corresponding to a same sub-band;

store the concatenated bits in the sub-band state register responsive to a length of the concatenated bits being less than the data bus width; and output a number of concatenated bits equal to the data bus width via the output data bus responsive to the length of the concatenated bits being greater than or equal to the data bus width.

9. The system of claim 8, wherein each of the plurality of sub-band state registers is configured to store a count of a number of bits stored by the respective sub-band state register, and wherein the bit packer is configured to concatenate the bits of the received stream of bits with the stored bits by:

determining a number of bits of the received stream of bits to concatenate with the bits stored in the sub-band state register; and increasing the stored count of the number of bits stored by the sub-band state register by the determined number of bits.

10. The system of claim 8, wherein the bit packer is configured to concatenate the bits of the received stream of bits with the stored bits by:

receiving a sub-band identifier identifying the sub-band of the bits of the received stream of bits; and accessing the bits stored in the sub-band state register corresponding to the identified sub-band.

11. The system of claim 8, wherein the entropy coder is configured to compress the plurality of sub-band components by variable-length encoding.

12. The system of claim 8, wherein the entropy coder is configured to compress the plurality of sub-band components by wavelet compression.

13. The system of claim 8, wherein the raw image data comprises at least one of high resolution image data and high frame rate image data.

14. A method for bit-packing compressed image data, the compressed image data comprising bits in each of a plurality of sub-bands, the method comprising:

receiving a stream of bits of the compressed image data to a bit packer;

concatenating, by the bit packer, the bits of the received stream of bits with bits stored in one of a plurality of sub-band state registers, the bits of the received stream of bits and stored bits corresponding to a same sub-band;

responsive to a length of the concatenated bits being less than a data bus width of an output data bus, storing the concatenated bits in the sub-band state register; and responsive to the length of the concatenated bits being greater than or equal to the data bus width, outputting a number of concatenated bits equal to the data bus width via the output data bus.

15. The method of claim 14, further comprising:

storing at each of the plurality of sub-band state registers, a count of a number of bits stored by the respective sub-band state register;

determining a number of bits of the received stream of bits to concatenate with the bits stored in the sub-band state register; and increasing the stored count of the number of bits stored by the sub-band state register by the determined number of bits.

16. The method of claim 14, wherein concatenating the bits of the received stream of bits with the stored bits comprises:

receiving a sub-band identifier identifying the sub-band of the bits of the received stream of bits; and accessing the bits stored in the sub-band state register corresponding to the identified sub-band.

17. The method of claim 14, further comprising:

receiving raw image;

converting the raw image to a plurality of sub-band components; and compressing the plurality of sub-band components to generate the compressed image data.

18. The method of claim 17, wherein compressing the plurality of sub-band components comprises compressing the plurality of sub-band components by variable-length encoding.

19. The method of claim 17, wherein compressing the plurality of sub-band components comprises compressing the plurality of sub-band components by wavelet compression.

20. The method of claim 17, wherein the raw image data comprises at least one of high resolution image data and high frame rate image data.

* * * * *